MAGNETIC TRANSDUCER HEAD ASSEMBLY

Filed Oct. 10, 1966 5 Sheets-Sheet 1

INVENTORS
RICHARD K. GERLACH
WILLIAM H. LAWRENCE

BY Louis A. Kline
John J. Maclago
Robert L. Harrington
THEIR ATTORNEYS

Nov. 25, 1969 R. K. GERLACH ET AL 3,480,936

MAGNETIC TRANSDUCER HEAD ASSEMBLY

Filed Oct. 10, 1966 5 Sheets-Sheet 2

INVENTORS
RICHARD K. GERLACH
WILLIAM H. LAWRENCE

BY Louis A. Kline
John J. Maclago
Robert L. Harrington
THEIR ATTORNEYS

INVENTORS
RICHARD K. GERLACH
WILLIAM H. LAWRENCE
Louis A Kline
BY John J. Mathago
Robert L. Harrington
THEIR ATTORNEYS

INVENTORS
RICHARD K. GERLACH
WILLIAM H. LAWRENCE

BY Louis A. Kline
John J. Maclago
Robert L. Harrington
THEIR ATTORNEYS

INVENTORS
RICHARD K. GERLACH
WILLIAM H. LAWRENCE

BY Louis A. Kline
John J. Maclaga
Robert L. Harrington
THEIR ATTORNEYS

United States Patent Office 3,480,936
Patented Nov. 25, 1969

3,480,936
MAGNETIC TRANSDUCER HEAD ASSEMBLY

Richard K. Gerlach, Rolling Hills Estates, and William H. Lawrence, Palos Verdes Estates, Calif., assignors to The National Cash Register Company, Dayton, Ohio, a corporation of Maryland Filed Oct. 10, 1966, Ser. No. 585,674
Int. Cl. G11b 5/00
U.S. Cl. 340—174.1 10 Claims

ABSTRACT OF THE DISCLOSURE

A head mounting assembly for a recording apparatus comprising a transducer head unit adapted to fly in an air film produced by a moving recording surface. The mounting assembly comprises an anchor assembly including a pad having a surface that forms an air foil whereby the pad is caused to ride on the air film spaced from the recording surface. Biasing means connecting the transducer head unit to the anchor assembly serves to bias the head unit at a substantially predetermined distance from the recording surface.

This invention relates to an apparatus having a head assembly adapted to perform read/write transducing operations on a magnetic recording media, and more particularly to the means for controlling the position of the transducing heads in the head assembly relative to the recording surface of the media.

This invention is especially adapted for computer systems where, for example, information is recorded onto or read off of a recording media such as a rotating magnetic coated disc. The transducing heads do not have to be in direct contact with the recording surface of the disc for performance of read/write transducing operations and whereas a direct contact of the head on the fast moving disc surface will create undesirable friction, it is preferable to design the apparatus with means for supporting the transducing head very close to but out of contact with the recording surface.

The head is supported above the disc surface by designing the head to ride on a moving layer or film of air that is carried by the surface of the disc. The moving air film is produced by the rapidly moving recording surface of a magnetic coated disc such as the type commonly used in random access magnetic data recording devices. The rotating disc generates a laminar flow of the film of air clinging to the record surface induced by frictional interaction between the surface and air film. Transducing heads that are designed to ride or float on such moving air films are generally referred to in the industry as flying heads.

The head unit which carries the transducing heads has a supporting or bearing surface that is provided to function in the manner of an air foil. The fast moving fluid of air riding on the disc pushes against the bearing surface and the hydrodynamic effect that is created produces a lifting force that establishes a spacing between the head unit and the disc surface.

A major difficulty that is encountered with the flying head is in controlling the distance at which the head flies from the disc surface. This distance is important for achieving the desired high quality recording operations and is desirably maintained within about 80 to 100 micro inches. The thickness of the air film carried by the disc is generally in the range of about 500 to 2000 micro inches. To cause the head to ride at the proper depth within the air film, a carefully calculated pressure is brought to bear against the head to force it the proper depth into the air film.

To achieve the desired pressure, the head units are commonly mounted on pressure biased leaf springs. Each spring is permanently tensioned to provide a constant spring biased pressure. With a proper mounting of the spring to a fixed reference point and of the head to the spring, the desired pressure can be applied against the disc surface.

A problem with the spring biased leaf springs is encountered where there are irregularities in the disc surface. As the head unit passes over the surface irregularities, there is a change in the position of the reference point relative to the disc surface. The tension exerted by the leaf spring will then also change and affect the depth at which the head unit flies within the air film. Whereas accuracy is required to the order of micro inches, even a slight irregularity in the flatness of the disc surface can provide an undesirable change in the position of the reference point relative to the disc surface which will affect the recording accuracy.

Manufacturing limitations make it very difficult to attain a disc surface with the desired optimum flatness. Furthermore, most systems are designed so that a plurality of discs are interchangeable. If the various discs have slightly different thicknesses, it follows that the spring tension for each of the various discs will be different and the distance at which the head flies from the surface will change.

In some known prior art devices the effects of the surface changes are reduced by using a head unit with a single head and by making the pressure biasing leaf spring relatively long. Presently however, speed has become increasingly more important and a multiple head arrangement which has access to a number of tracks on the disc from a single position of the head assembly can operate on the numerous tracks of a disc with far fewer position changes of the head assembly and accordingly at a much faster rate than a head assembly having but a single head.

As far as it is known, heretofore there has been no known satisfactory means for adapting a flying head assembly having a desired number of heads to a disc recording which can tolerate such surface changes. In the present invention what is believed to be a new approach is taken to minimize the undesirable effects of the surface changes. The heads are still mounted on springs which are anchored to a reference point, but rather than maintaining the reference point fixed, means are provided to cause the reference point to adjust to the surface changes. In general, this is accomplished by anchoring the leaf spring to a floating pad which rides over the thin film of air on the disc surface in somewhat the same manner as the head unit. In such an arrangement the pad rises and falls with the surface and accordingly the reference or anchor point of the leaf spring rises and falls to maintain a constant spring biased pressure against the heads.

The invention and its advantages will be further understood by reference to the detailed description and drawings wherein.

Figure 1:
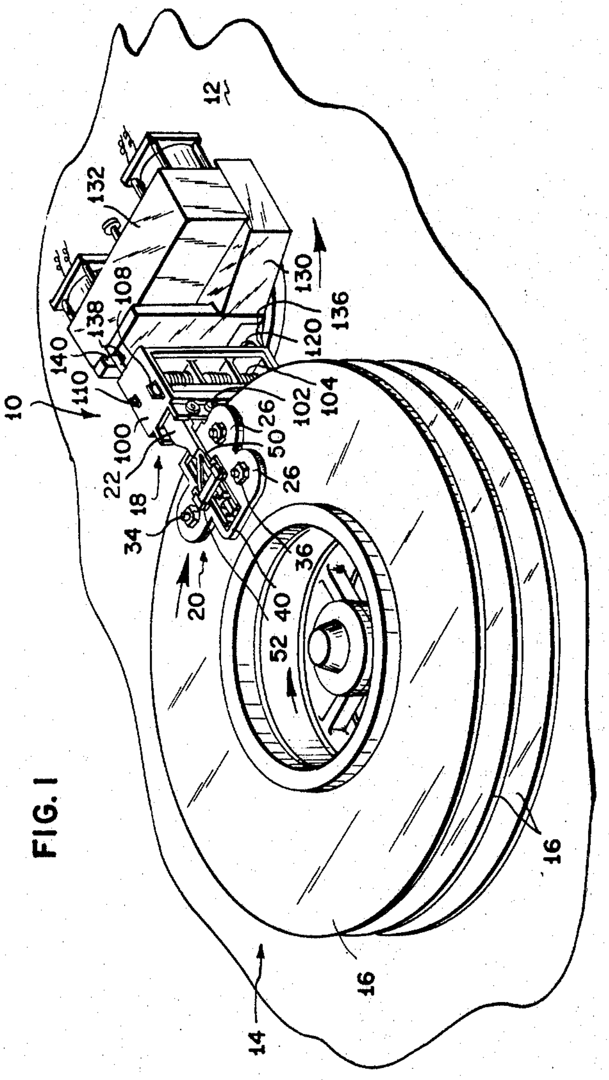
FIG. 1 is a perspective view of a disc memory storage and retrieval apparatus in accordance with the invention.

FIG. 1 illustrates a magnetic recording storage apparatus 10, such as used for computerized systems. The apparatus in general is comprised of a base plate 12 having a disc storage unit 14 including three discs 16 rotatably mounted on the base plate. The disc storage is rotatably driven by a suitable means (not shown). A positioning mechanism 18 is pivotally mounted to the platform and is interconnected through a linkage member 22 to six head assemblies 20 (only one of which is shown in FIG. 1). The positioning mechanism, as will be explained in a later section, positions the six head assemblies with respect to the six surfaces of the three discs 16 (including both the upper and lower surfaces of the discs) to enable the performance of transducing operations thereon.

HEAD ASSEMBLY

Figure 2:
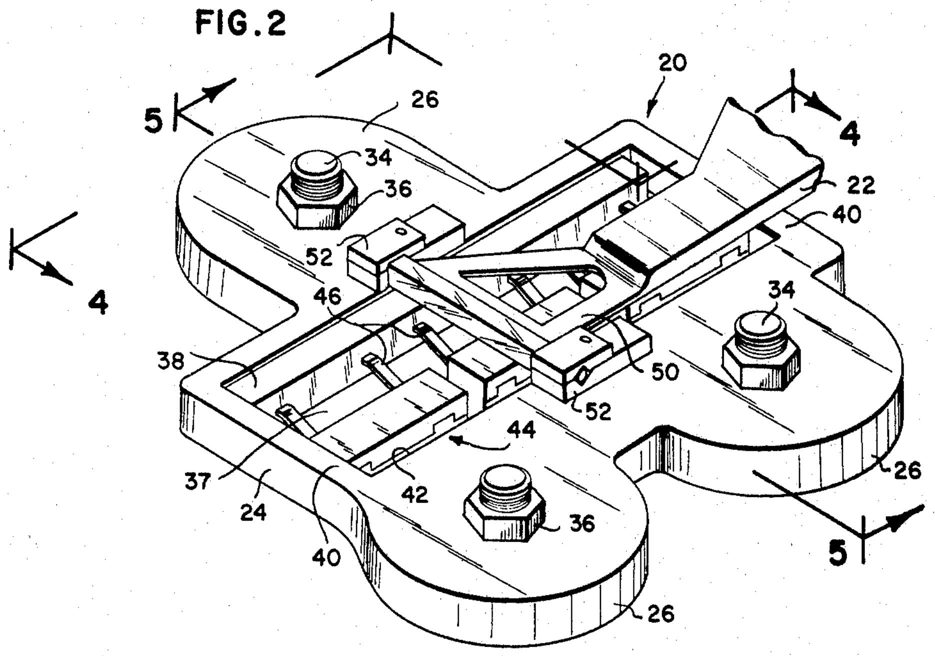
FIG. 2 is a perspective top view of the head assembly used in the apparatus of FIG. 1.
Figure 5:
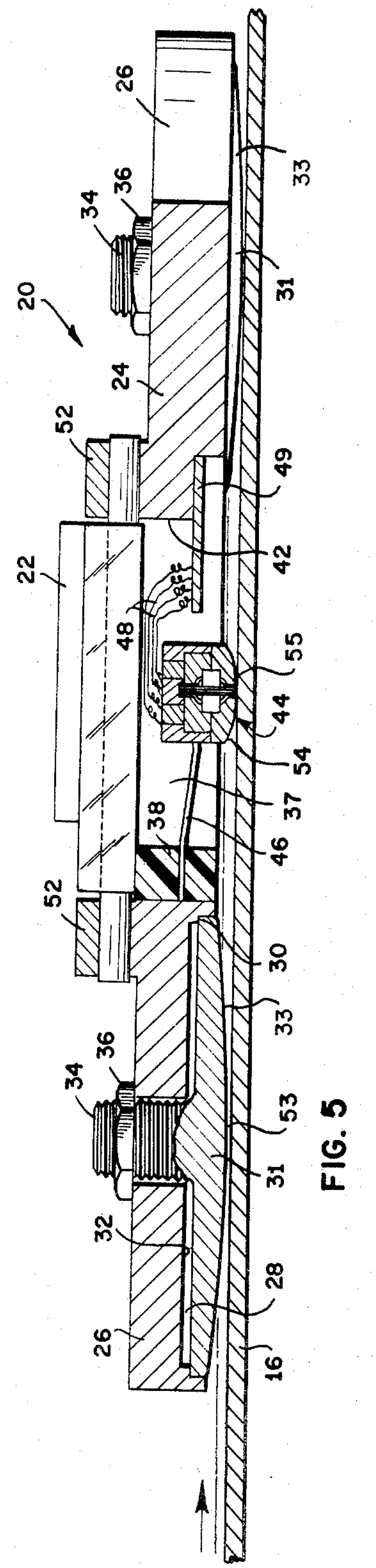
FIG. 5 is a cross-section of the head assembly as taken on lines 5—5 of FIG. 2 and further illustrating the head assembly being supported by a moving air film carried by a rotating disc.

As best seen in FIG. 2, the head assembly comprises a frame 24 in the form of a tripod having three co-planar pads 26. Referring to FIG. 5, a circular chamber 28 (e.g., having a diameter of 1 inch and a depth of .080 inch) is provided in the bottom or disc engaging side of each pad 26 with an annular rim or shoulder 30 on the inner peripheral wall of the chamber. A circular plate 31 is provided with a spherical convex surface 33 and is formed of a stable metal, e.g., certain grades of aluminum, such as 6061 aluminum. The plate 31 has the same diameter as the cylindrical chamber 28 and it is seated within the chamber with the upper peripheral edge of the plate abutted against the shoulder 30 to provide a spacing between the plate and an end wall 32 of the chamber. A shaft 34 extends from the center of the plate on the side opposite the convex surface through the end wall 32. A nut 36 is engaged with the threaded end of the shaft 34 to securely fasten the plate against the shoulder 30 within he chamber. The depth at which the shoulder 30 is positioned within the chamber 28 provides exposure of the convex surface of the plate below the tripod frame 24. By tightening the nut 36 onto the shaft 34, the central portion of he plate can be drawn into the spacing to vary the degree of curvature of the ouetr convex surface of the plate. The effect of varying the degree of curvature will be explained in a later section.

Figure 3:
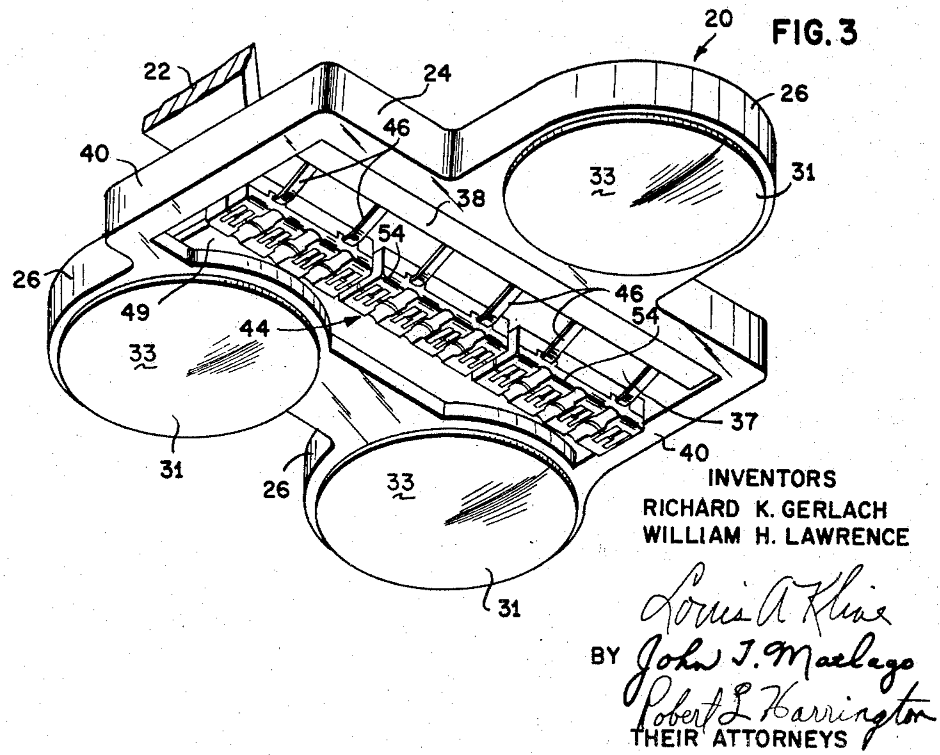
FIG. 3 is a perspective bottom view of the head assembly shown in FIG. 2.

As noted in FIGS. 1 and 2, the three pads 26 are positioned relative to the linkage 22 so that a single pad is forward of the linkage and two of the pads are rearward of the linkage (forward and rearward being referenced to the direction of rotation of the disc, i.e., the leading or forward pad leading into or against the direction of rotation indicated by the arrow shown in FIG. 1). As seen in FIGS. 2, 3 and 5, between the forward and rearward pads is a rectangular window or opening 37 that occupies a central position within the tripod frame 24. An anchor bar 38 forms the back edge of the forward pad and the front wall of the window. Rearward extending braces 40 of the tripod frame 24 provide the side walls of the window 37 and are interconnected to a front or leading edge across the two rearward pads which provides the back wall 42 of the window. The front and back walls of the window are generally parallel to the linkage 22 and, when in operative position, to the radius of the disc 16 (see FIG. 1).

Figure 4:
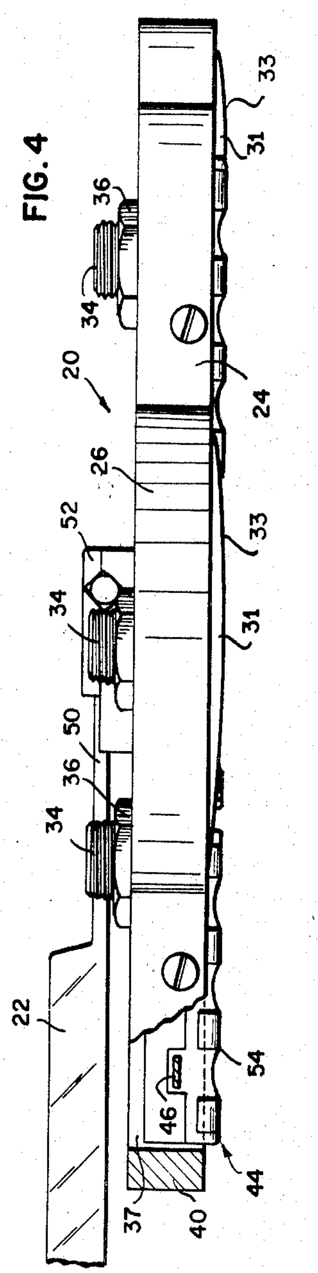
FIG. 4 is a front view of the head assembly as taken on lines 4—4 of FIG. 2.

A plurality of head units 44 each containing a plurality of read and write heads (three head units each carrying four pairs of read/write heads) are mounted within the window 37 (see FIGS. 2, 3 and 4). The construction for a suitable head unit is disclosed in the commonly assigned copending application Ser. No. 564,912, entitled "Magnetic Head Device" filed in the name of John J. Miyata on July 13, 1966. The mounting for the head units comprises, for each head unit 44, a pair of leaf springs 46 (FIGS. 2, 3 and 5). One end of each spring is firmly anchored to the anchor bar 38 and the other end is embedded in the front side of the head unit. It is desired that each spring be mounted so as to provide a constant predetermined pressure against the head unit. Thus, the spring is carefully formed and spring tempered from a specific length of a suitable material. For the preferred embodiment the leaf springs are formed from beryllium copper with a stress of 10–15 grams each (pressure). The heads of the head unit 44 are controlled through electrical wires 48 (FIG. 5) that interconnect the respective read/write heads to a panel board 49 extending from the back wall 42 of the window. The panel is connected to a control means that is not shown.

Figure 6:
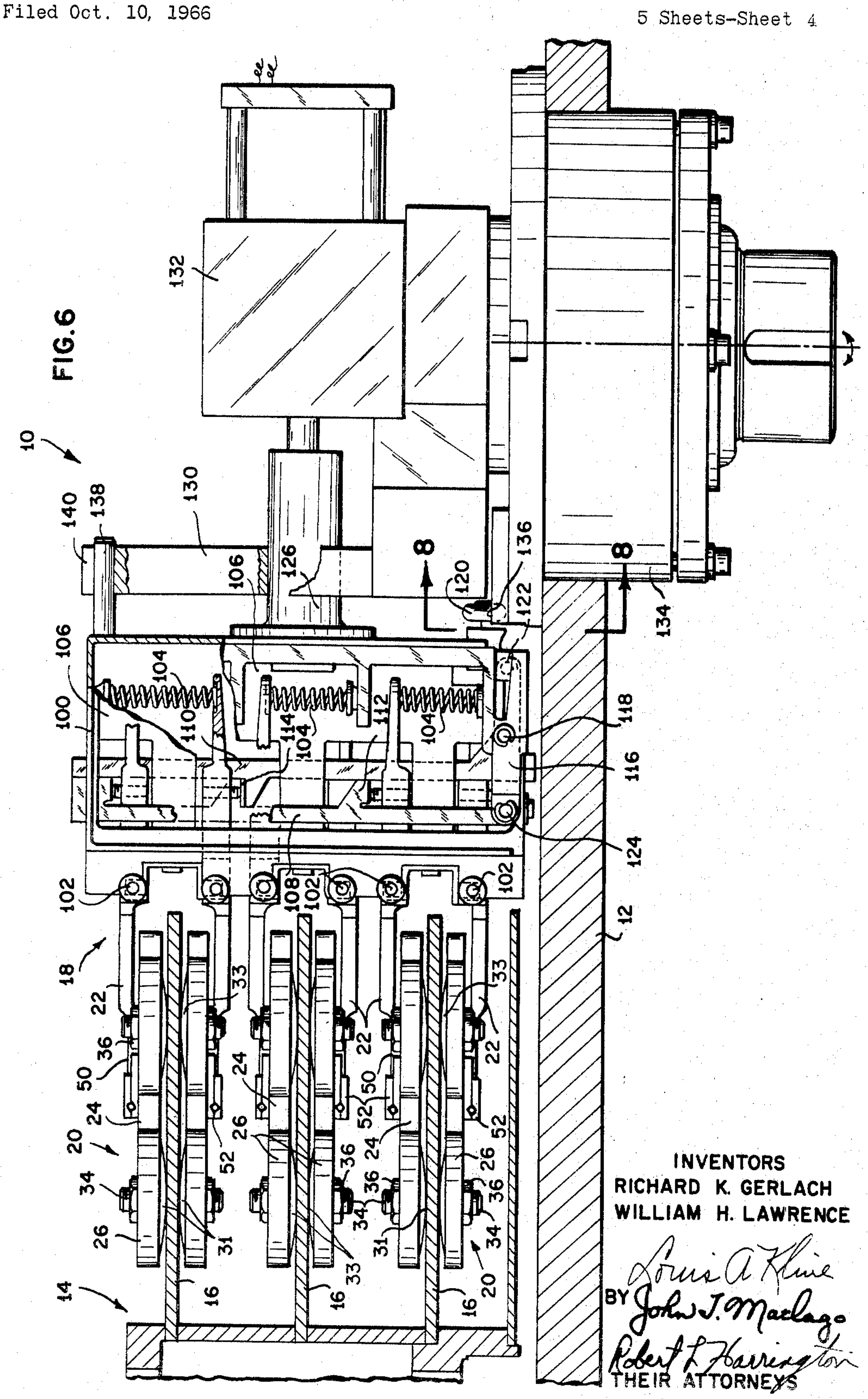
FIG. 6 is a partially sectioned side view of the positioning mechanism shown in FIG. 1 which moves the head assembly into and out of operative position relative to the disc surface.
Figures 7, 8:
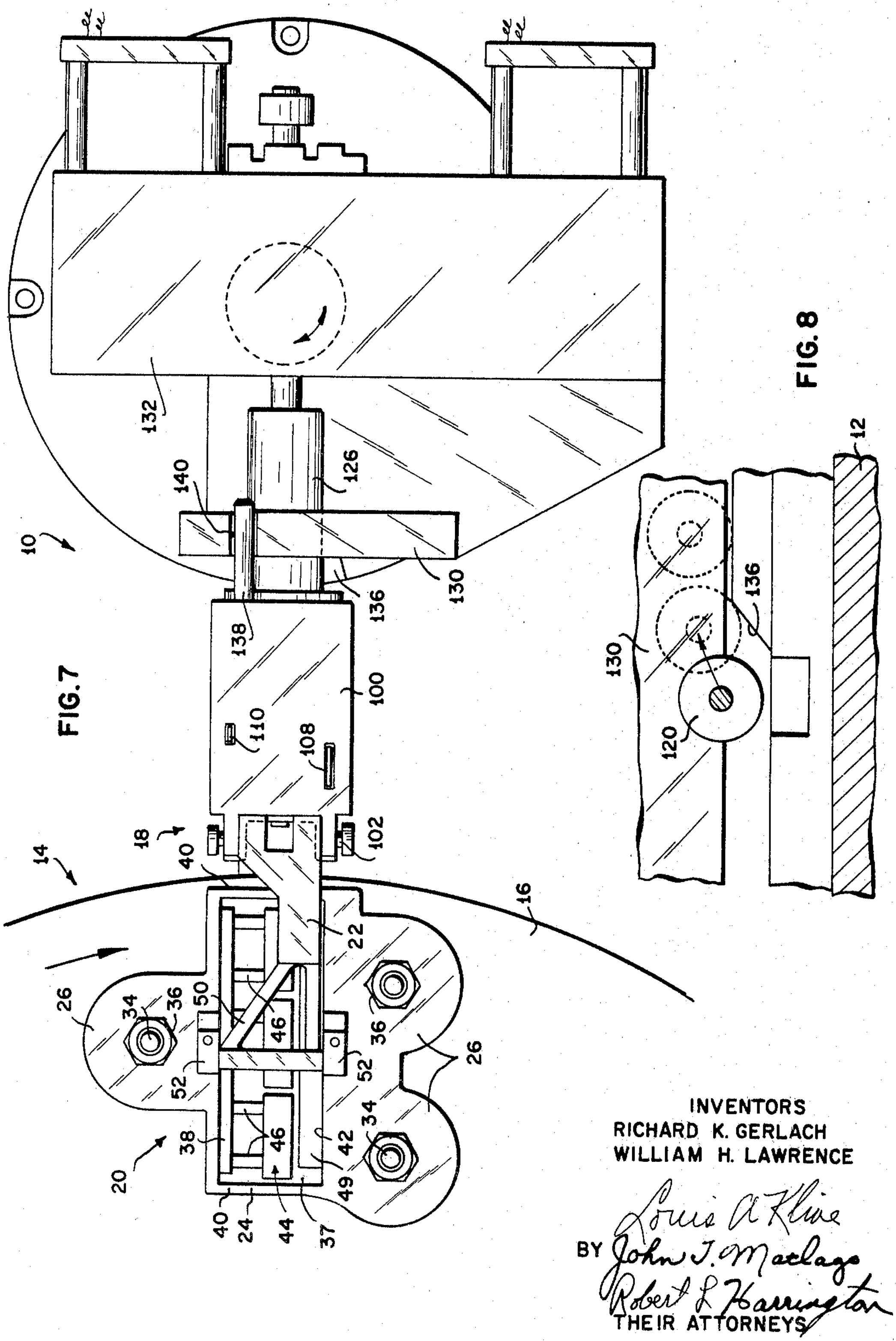
FIG. 7 is a top view of the positioning mechanism of FIG. 6.
FIG. 8 is an enlarged view of a portion of the positioning mechanism taken on lines 8—8 of FIG. 6.

As shown most clearly in FIGS. 2, 6 and 7, the linkage member 22 has an end portion 50 of thin resilient metal or the like, that is reduced both in thickness and width. The end portion 50 has a pivotal connection through brackets 52 to the tripod frame 24 and in cooperation with the reduced dimensions, functions as a resilient two way hinge or coupling. When the positioning mechanism positions the head assembly toward a corresponding disc surface (described in more detail hereafter), the end portion 50 spring biases the head assembly toward the surface while permitting sufficient tilting of the head assembly to conform to the disc surface.

POSITIONING MECHANISM

A suitable positioning mechanism 18 for moving the head assemblies into operative position with respect to the disc surfaces is illustrated in FIGS. 6–8. Referring to FIG. 6, linkage members 22 carrying head assemblies 20 are connected to an assembly frame 100 through pivotal connections 102 intermediate the ends of the linkage. Compression springs 104 anchored to the frame 100 are connected to the end of each linkage member 22 (opposite the end carrying the head assembly) for urging pivotal movement of the head assemblies toward the disc surfaces. Three of the compression springs urge counterclockwise movement (as viewed in FIG. 6) of the three head assemblies for operating on the upper side of the discs (hereafter referred to as the upper head assemblies, two of which are shown in FIG. 6) and the other three springs urge clockwise movement of the head assemblies for operating on the under side of the discs (hereafter referred to as the lower head assemblies, the uppermost of which is shown through the cut out portion of web 106 as shown in FIG. 6).

Bar members 108 and 110 are connected to the assembly frame 100 for slidable vertical movement. Lug portions 112 on bar member 108 are provided to engage the linkage members 22 for the upper head assemblies and lug portions 114 on bar members 110 are provided to engage the linkage members 22 for the lower head assemblies, all of which linkage engaging lugs are adapted for urging pivotal movement of the linkage members opposite the pivotal force produced by the compression springs 104.

A bracket 116 has a pivotal connection 118 to the assembly frame 100. A cam follower comprising an idler roller 120 is carried by the backet 116. The bar 110 is connected through pivotal connection 122 to the bracket 116 intermediate the pivotal connection 118 of the bracket to the frame 100 and the roller 120. The bar 108 is connected through pivotal connection 124 to an extension of the bracket 116 whereby the pivotal connection 118 of the bracket 116 to the frame 100 is between it and the idler roller 120. Thus, as the cam follower roller 120 is moved up and down by a cam surface to be described hereafter, the bar 110 likewise moves up and down, engaging the linkage members 22 of the lower head assemblies in the up stroke, forcing them counterclockwise against the force of the compression spring to pivot said lower head assemblies away from the lower disc surfaces. The bar member 108 being connected to the extended portion of bracket 116 moves opposite to the roller and accordingly opposite to the movement of bar member 110. Thus, as bar member 110 moves upwardly to rotate the lower head assemblies counterclockwise, bar member 108 moves downwardly to rotate the upper head assemblies clockwise and away from the upper surfaces of the discs.

The assembly frame 100 is adapted to move laterally for shifting the head assemblies radially with respect to the disc surface. Thus, the heads carried by the head assemblies can be shifted between a plurality of tracks on the disc surface, i.e., the twelve heads carried by the head assembly can be shifted to accommodate, for example, 48 tracks or more. Means are also provided for pivoting the frame 100 to move the head assemblies into a retracted position away from the discs, e.g., for changing the discs, etc. These movements of the assembly frame are described in the following:

The assembly frame 100 is supported above the base plate 12 by a spud shaft 126 that is interconnected with a track selecting mechanism 132 that is carried by a support member 130. The track selecting mechanism 132 is adapted for laterally moving the spud 126 into a specific position selected from a number of available positions. These positions are coordinated for aligning the transducing heads carried by the head assemblies with the various tracks located on the disc surface. A detailed description of a suitable actuator for the track selecting mechanism forms a part of the disclosure of a commonly assigned copending patent application filed in the name of Miller et al. and bearing Ser. No. 573,313.

The support member 130 is rotatably supported on the base plate 12 and the rotative positioning of the support member which determines the rotative position of the assembly frame and head assemblies, is controlled by a control mechanism 134 (FIG. 6). The support member 130 is rotated between two positions, i.e., a first position where the head assemblies are retracted away from the discs and a second position where the head assemblies are in operative position. A cam surface 136 (FIG. 8) is provided on the base plate 12 in the path of the idler roller 120 as the assembly frame is pivoted between the first and second positions. In the first position the raised area of the cam surface forces the follower roller 120 upward and, as described above, the bar members 108 and 110 are pivoted into their retracted positions outwardly from the disc surfaces. As the assembly frame is rotated toward the discs (which occurs only while the discs are rotating) the follower roller 120 is moved down the cam surface and over the relief area (as shown in FIG. 8). The head assemblies are thus properly located over their respective disc surfaces and because the follower roller 120 is positioned over the relief area of the cam surface, compression springs 104 can apply the spring biased rotative force to the head assemblies for urging the transducing heads toward the disc surfaces until such spring biased force is balanced by the resistance produced by the air film acting against the bearing surfaces of the pads. The actuator mechanism can then position the head assemblies over any desired tracks. With the follower roller 120 in the relief area of the cam surface 136 and out of contact with the base plate 12, the roller 120 avoids frictional resistance during such movement. Guide pin 138 located at the top of the assembly frame 100 (FIGS. 1, 6 and 7) is inserted into guideway 140 of the support member 130 maintaining the desired upright position of the assembly frame during the movements.

OPERATION

As described heretofore, the moving surfaces of the rotating discs carry a thin film of air. The head assembly is positioned toward the disc surface by the above described positioning mechanism only while the disc is rotating and thus, only while the moving air film is present. Referring to FIG. 5, as the curved plates of the tripods settle into the flowing air film, the air moves against the leading curved surface of the plates 31 and produces a lifting force thereagainst, i.e., the curved surface functions as an air foil. The spacing that results is in the order of several thousandths of an inch. It is not readily apparent from the drawing and is represented by reference numeral 53. The rotation of the disc is constant and thus the lifting force of the air film is constant. Also, the pressure exerted by the compression spring 104 remains constant so that the only variable affecting the position of the tripod relative to the air film is the curvature of the plate 31 which, as described, can be changed by adjustment of the nut 36. As the radius of curvature is increased, the pad is lifted further away from the disc surface, and vice versa. Thus, the position of the tripod relative to the disc surface is controlled by independent adjustment of the curvatures of the three plates 31, i.e., by tightening or loosening the nuts 36 on the shafts 34. It will thus be seen that whereas the air film necessarily conforms to any irregularities on the surface of the generally flat disc, the tripod can be set to provide a particular position relative to the disc and whereas such position is determined by the air film, it also will conform to the irregularities.

The pressure of the leaf springs 46 forces the head unit 44 below the tripod and into the air film, e.g., to less than a thousandth of an inch, represented in FIG. 5 by reference numeral 55. The spacing of the head units 44 above the disc surface is carefully controlled by providing the proper tension to the leaf springs and by establishing the proper spacing of the tripod relative to the disc surface. The cantered leading edge 54 of each head unit induces a lifting force on the head unit in opposition to the spring biased force of the leaf springs. A proper balance of the forces is established and whereas the leaf spring is anchored to the tripod which is in a substantially constant position relative to the disc surface, the head units 44 will likewise be caused to fly or float a desired constant distance from the disc surface.

It has been found that making the plates 31 relatively large as compared to the head units stabilizes the tripod with respect to the air film. The lifting force induced by the moving air against the pads is substantially great to resist a substantial spring pressure from compression springs 104 which urges the tripod toward the disc surface. Thus, the spring pressure of the leaf springs urging the head toward the disc can be widely varied without affecting the position of the tripod. The tripod thus provides a substantially stable anchor point (with respect to the disc surface) for the leaf springs.

In a specific structure of the above embodiment, the desired curvature of the plate 31 was provided by first forming a plate into a flat disc having a 1 inch diameter. The nut 36 was tightened to draw the flat plate into the chamber 28 to provide a concave curvature having a radius of about 22 to 30 ft. with a crown depth of about .001–.0015 inch. The outside surface of the plate was then ground flat and by loosening the nut 36, the outer surface of the plate 31 formed a convex bow with the maximum radius of curvature (i.e., with nut 36 fully loosened) approaching the originally formed concave bow, i.e., with a crown depth of about .0012–.0014 inch.

The preferred disc recordings have a diameter of about 14 inches. The disc is preferably rotated about 1600 to 2400 r.p.m. (providing a surface speed over which the head assembly flies ranging from about 600 to 3000 inches per sec.) and the film of air carried by the disc has a thickness of about 800–1000 micro inches. It is preferred for best recording results to maintain the spacing between the heads and the disc surface about 80 to 100 micro inches. It is understood that the points on the disc surface that are closer to the center have a slower linear speed. Therefore, the speed of the air film at such points is also slower and the lifting force is accordingly less. Thus, in order to maintain the pads a uniform height above the disc surface, the curvature for the inner rear pad must be greater than that of the outer rear pad. It was found that for the embodiment herein described, the desired settings of the three pads (having 1 inch diameters) were as follows: .0007 inch crown height for the outer rear pad (having the outermost position), .0009 inch crown height for the front pad, and .0004 inch crown height for the inner rear pad (having the innermost position).

Figure 9:
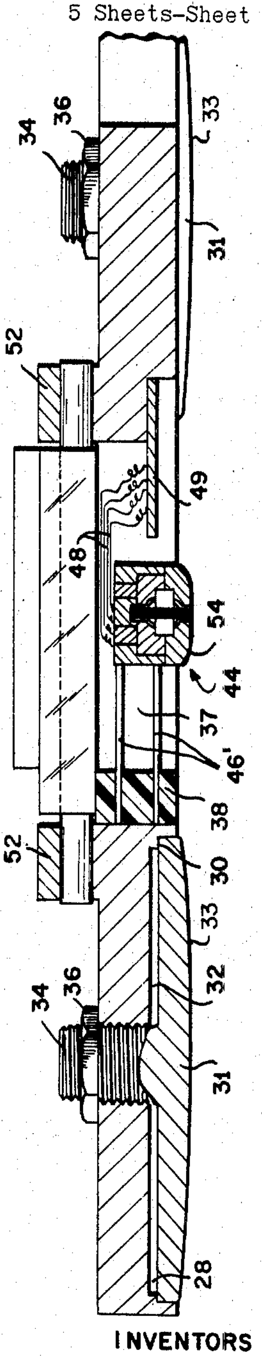
FIG. 9 is a cross-section of a head assembly similar to FIG. 5 but illustrating a second embodiment of the invention.

A second embodiment of the invention is illustrated in FIG. 9. This embodiment is distinguished over the first described embodiment in the mounting of the head units 44 to the anchor bar 38. For each spring 46 of the previous embodiment, the second embodiment has a parallel coupling comprised of a pair of leaf springs 46′ mounted in parallel and positioned one over the other. The parallel springs 46′, the anchor bar 38 at one end of the springs and the head unit at the other end form a parallelogram the opposite sides of which are always in parallel. Therefore, although the springs are resilient and permit vertical movement of the head unit, the head unit maintains a constant angular position with respect to the anchor bar. The angular position of the anchor bar 38 is dictated by the assembly frame 24. The angular position of the frame relative to the disc recording is dictated by the respective curvatures of the three plates 31. Thus, proper adjustment of the crown height of the three plates 31 controls the angle at which the head unit flies relative to the disc. For example, it may be desirable to cause the leading edge of the head unit to be tilted upwardly, e.g., to increase the hydrodynamic effect of the air flowing against the head unit causing it to be further spaced from the record. This can be done by merely increasing the crown height of the leading pad.

It will be understood that the above embodiments of the invention merely illustrate the invention and do not limit it. For example, it is believed to be novel to provide a reference or anchor point for spring biasing a flying head unit against a moving recording surface, which reference point floats on an air film carried by the moving surface to automatically adjust to the contour of the recording surface. Thus, it is contemplated that various arrangements of different numbers of floating pads can be utilized to establish the reference point. Furthermore, the plate 31 of the pad may be formed into various shapes and curvatures whereby a suitable floating action is derived.

While there have been shown, described and pointed out the fundamental novel features of the invention, as applied to the preferred embodiments, it will be understood that various omissions, substitutions and changes in the form and details of the device illustrated and in its operation may be made by those skilled in the art, without departing from the scope and spirit of the invention. It is the intention, therefore, to be limited only as indicated by the following claims.

What is claimed is:

1. A head assembly for a recording apparatus comprising a transducing head unit adapted to fly in an air film carried by a moving recording surface, a pad providing an anchor point for the head unit, said pad having a surface that forms an air foil whereby the pad is caused to ride on said air film spaced from said recording surface, and biasing means anchored to the floating pad and interconnected with the head unit for biasing the head unit into the air film a substantially predetermined distance from the recording surface.

2. A head assembly for a recording apparatus as defined in claim 1 wherein the biasing means comprises permanently tensioned leaf springs and the air foil of the floating pad is comprised of a surface having a spherical convex curvature.

3. A head assembly for a recording apparatus as defined in claim 2 including means for adjusting the degree of curvature of the spherical convex surface to modify the effect of the lifting force on the floating pad produced by the moving air film.

4. A head assembly for a recording apparatus as defined in claim 3 wherein the air foil is provided by a spherical convex curved plate, said plate seated in a chamber of the pad with the peripheral edge of the plate supported by a shoulder provided within the chamber for spacing the central portion of the plate from a wall at the end of the chamber, a shaft extending from the side of the plate opposite the convex curvature and through the end wall of the chamber, and means for engaging the shaft outside the chamber and for drawing the center of the plate into the chamber toward the end wall to vary the degree of curvature of the plate.

5. A transducing head assembly useful in a magnetic disc memory storage apparatus of a computerized system comprising a pad having a spherical convex surface, means for positioning said surface of the pad against a rotating disc of the apparatus with the air film carried by the disc causing the pad to float above the disc surface, a plurality of leaf springs having one end anchored to the floating pad, and a head unit carrying a plurality of read/write magnetic transducing heads mounted to the other end of the springs, said springs being permanently biased to urge the head unit toward the disc surface, and said head unit having a leading edge angularly disposed with respect to the air film that induces the head to ride over the air film, said spring-biased pressure of the leaf springs that is directed toward the disc surface and said induced lifting force of the leading edge of the head unit that is directed outwardly from the disc being balanced to maintain the head unit a desired spacing from the disc surface.

6. A transducing head assembly useful in a magnetic disc memory storage apparatus of a computerized system as defined in claim 5 wherein three of said floating pads are assembled into a tripod forming three co-planar pads, each pad having a circular cavity with an annualr rim on one end of the cavity and an end wall at the other end, a spherically convexly bowed resilient plate seated within the cavity with the peripheral edge of the plate abutted against the annular rim, and a shaft extending from the center of the plate through the end wall to draw the central portion of the plate into the cavity for varying the degree of convex curvature.

7. A transducing head assembly useful in a magnetic disc memory storage apparatus of a computerized system as defined in claim 6 wherein said leaf springs are disposed in pairs that form parallel couplings for permitting movement of the head unit toward and away from the recording surface while maintaining a desired angular position of the head unit relative to the recording surface.

8. A head assembly for a recording apparatus comprising a read/write transducing head unit adapted to fly in an air film carried by a moving recording surface, a floating pad providing an anchor point for the head unit, said pad having a surface that forms an air foil whereby the pad is caused to float on said film spaced from said recording surface, and permanently tensioned leaf springs having one end anchored to the floating pad and the other end affixed to the head unit for spring-biasing the head unit into the air film below the floating pad a substantially predetermined distance above the recording surface, said leaf springs disposed in pairs that form parallel couplings for permitting movement of the head unit toward and away from the recording surface while maintaining a desired angular position of the head unit relative to the recording surface.

9. In a disc memory storage apparatus of a computerized system, a plurality of magnetic recording discs disposed one over the other in spaced parallel relationship and adapted for rotative movement, both upper and lower surfaces of the discs having a magnetic coating for receiving recorded information from magnetic transducing heads, a plurality of head assemblies, a positioning mechanism for positioning a head assembly for transducing operation on each of the upper and lower surfaces of the discs, said head assemblies comprised of a tripod frame having three interconnected pads, each of said pads having a bearing surface that functions as an air foil when positioned toward a moving air film carried by the rotating disc surfaces, head units including a plurality of read/write transducing heads adapted to fly in said air film, leaf springs interconnecting the head units to the tripod frame for spring-biasing the head units into the air film below the tripod frame a predetermined distance above the disc surface, an assembly frame, linkage members interconnecting the head assemblies to the assembly frame, spring members anchored to the assembly frame and connected to the linkage members for urging pivotal movement of the head assemblies toward the disc surfaces, means for providing pivotal movement of the linkage members away from the disc surfaces, and positioning means for positioning the assembly frame to locate the head assemblies between a retracted position and an operative position with respect to the magnetic discs.

10. A transducer head assembly for use with a magnetic recording disc comprising: at least one transducer head adapted to ride on an air film which is carried by a moving recording surface of the disc, at least one pad providing a floating anchorage for the transducer head and having a surface forming an air foil which rides on said air film and thereby maintains the pad spaced from the recording surface, and resilient means connecting the transducer head to the pad and biasing the transducer head into said air film whereby the transducer head is maintained at a substantially predetermined distance from the recording surface.

References Cited

UNITED STATES PATENTS

| | | | |
|---|---|---|---|
| 3,051,954 | 8/1962 | Osterlund | 179—100.2 |
| 3,191,165 | 6/1965 | Keel | 340—174.1 |
| 3,187,315 | 6/1965 | Cheney | 340—174.1 |
| 3,308,450 | 3/1967 | Bourdon et al. | 340—174.1 |
| 3,349,384 | 10/1967 | Kohn | 340—174.1 |

STANLEY M. URYNOWICZ, Jr., Primary Examiner

VINCENT P. CANNEY, Assistant Examiner

U.S. Cl. X.R.

179—100.2